Figure 18:
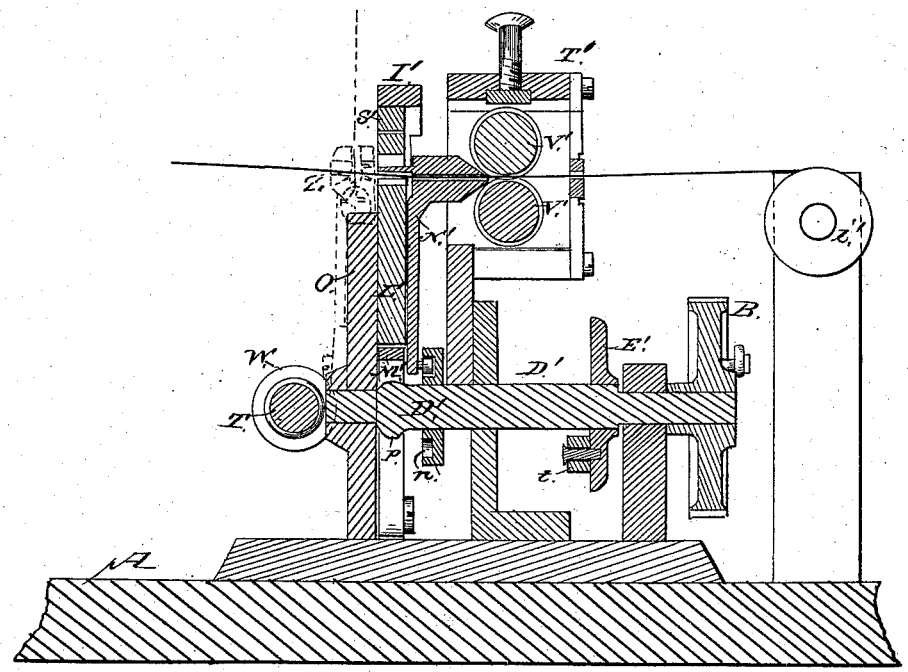

N. G. & T. D. ROSS.
Wire-Barbing Machine.
No. 214,706. Patented April 22, 1879.
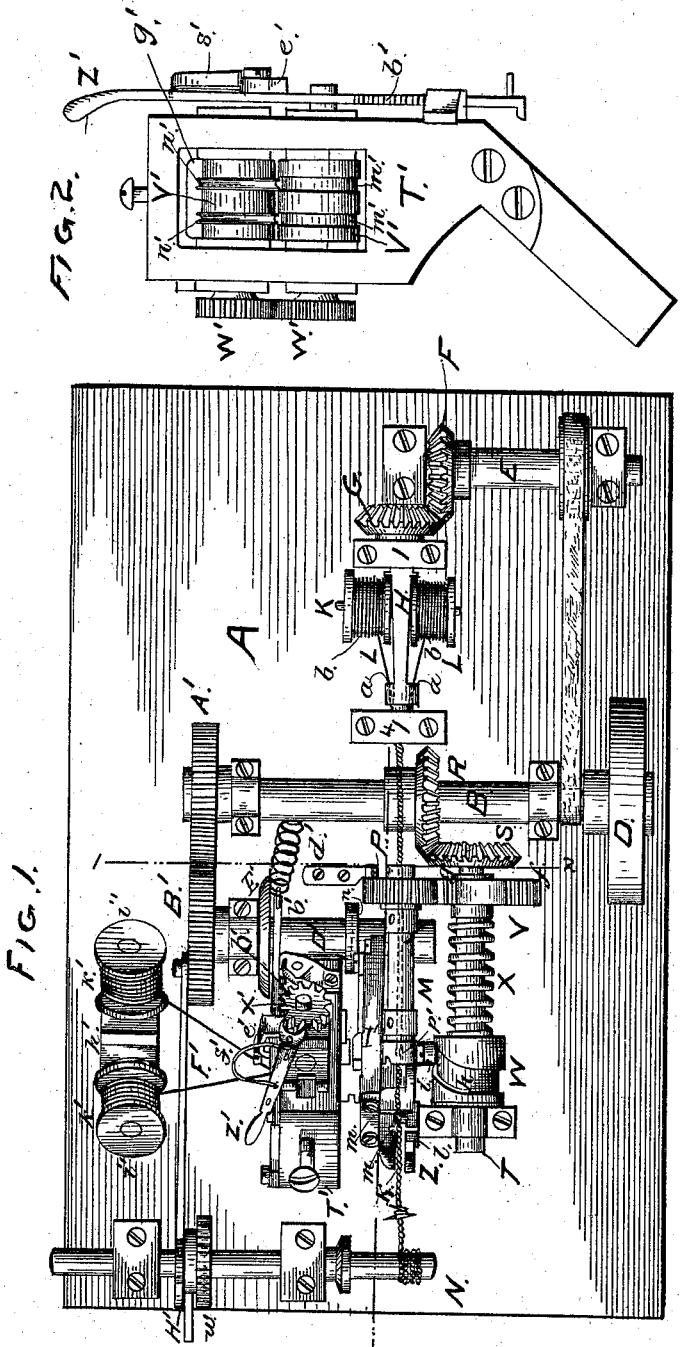

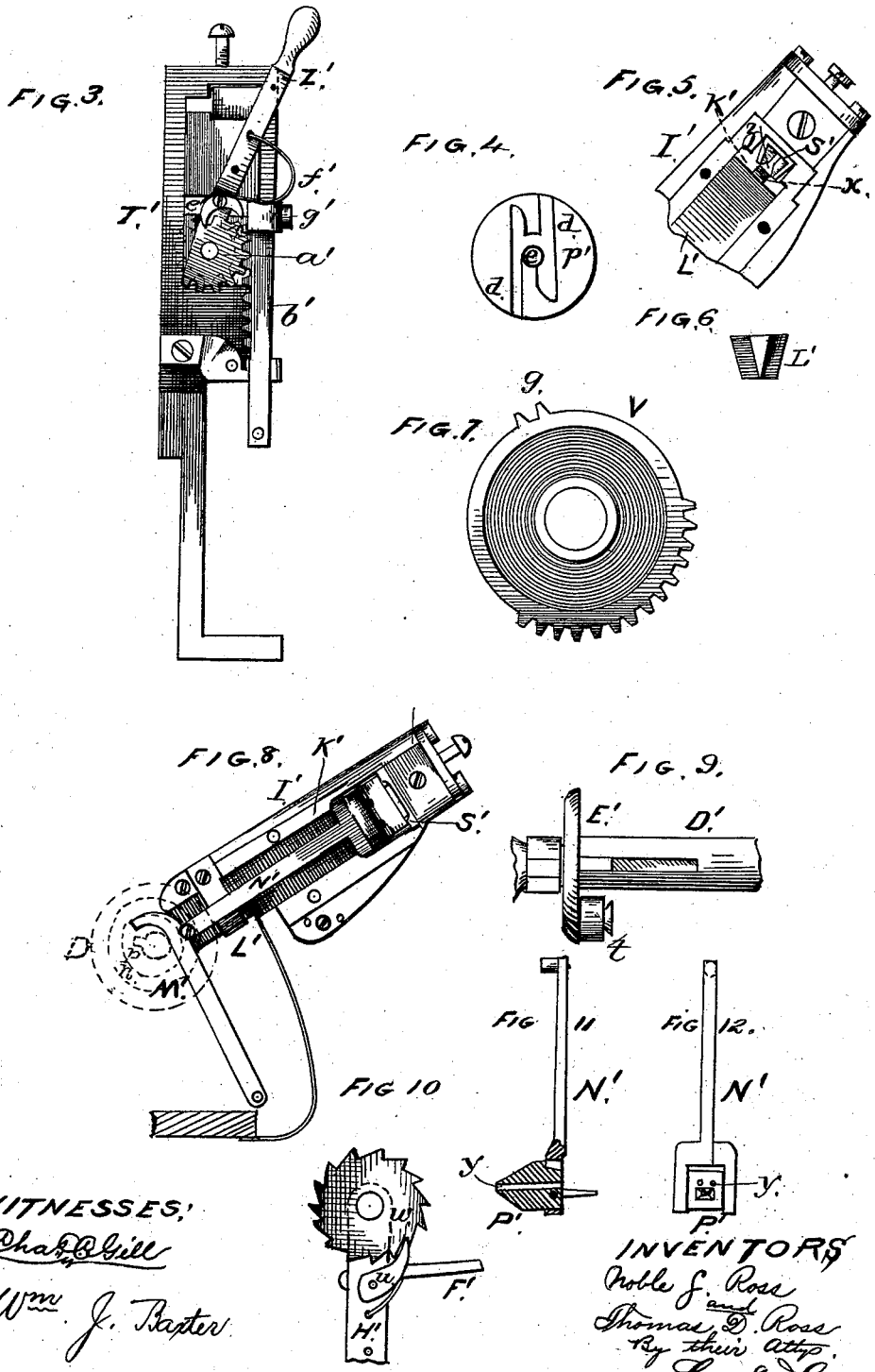

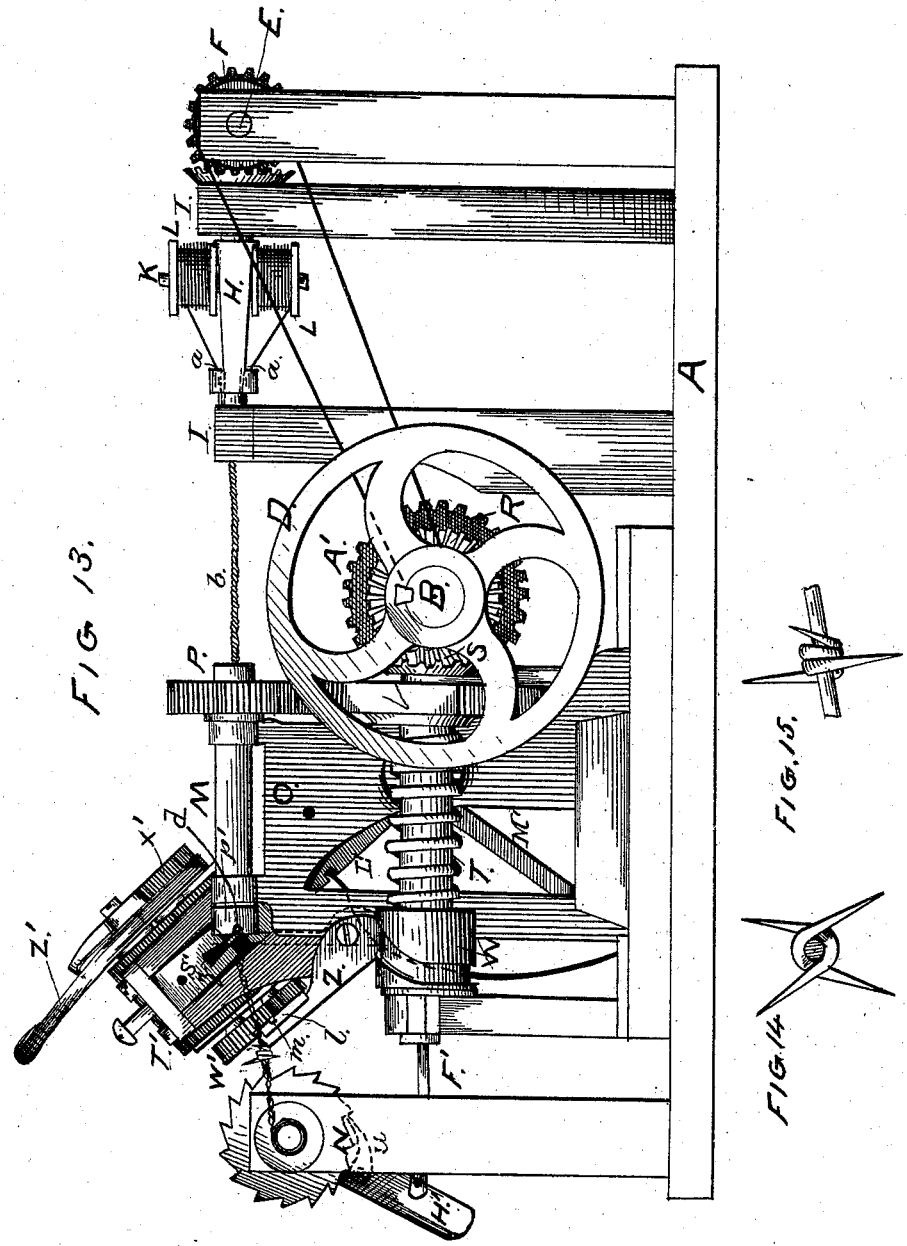

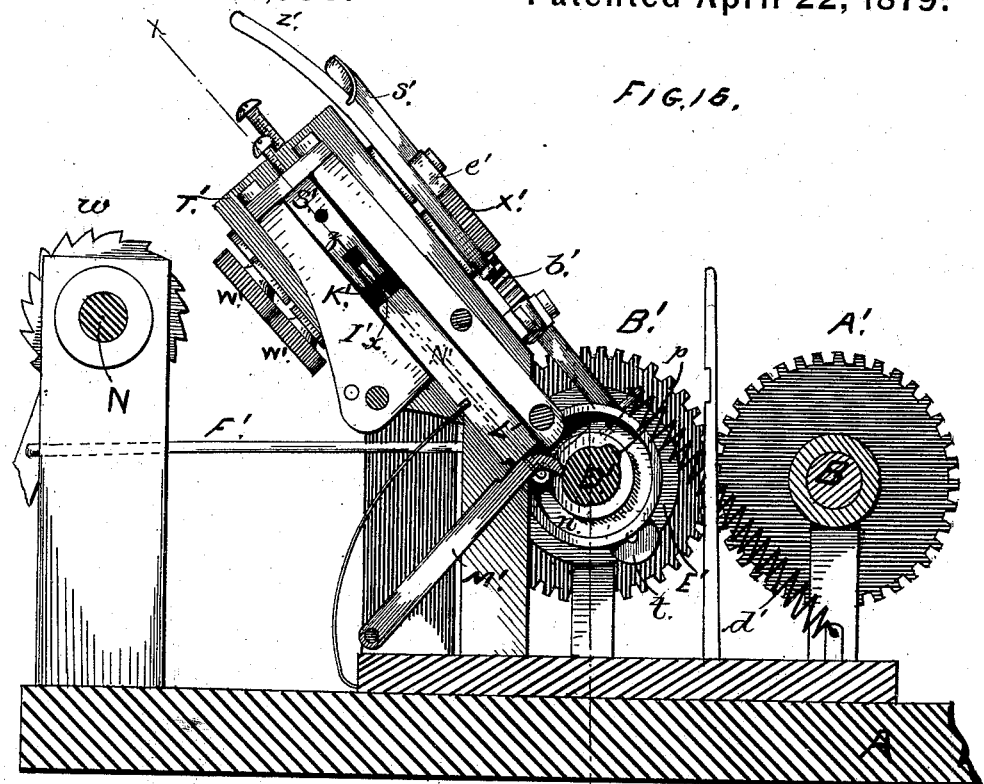
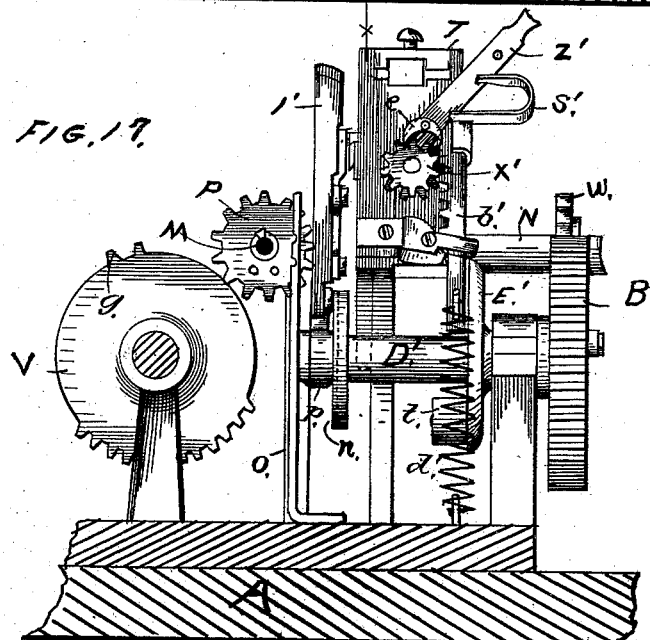

N. G. & T. D. ROSS.
Wire-Barbing Machine.

No. 214,706. Patented April 22, 1879.

UNITED STATES PATENT OFFICE.

NOBLE G. ROSS AND THOMAS D. ROSS, OF DES MOINES, IOWA.

IMPROVEMENT IN WIRE-BARBING MACHINES.

Specification forming part of Letters Patent No. 214,706, dated April 22, 1879; application filed May 18, 1878.

*To all whom it may concern:*

Be it known that we, NOBLE G. ROSS and THOMAS D. ROSS, of Des Moines, in the county of Polk and State of Iowa, have invented a new and useful Improvement in Machines for Barbing Wire, of which the following is a specification, reference being had to the accompanying drawings.

The invention relates to an improvement in machines for barbing wire; and consists in the devices hereinafter set forth.

The object of the invention is to supply a suitable means for twisting the wires forming the cable, and for forming four-pointed barbs and attaching them to the said cable, as hereinafter expressed.

In the accompanying drawings, Figure 1 is a top view of a device embodying the elements of the invention. Fig. 2 is a side view of the frame T' and feed-rollers V'. Fig. 3 is a face view of the frame T', showing the cog-wheel X' in dotted lines. Fig. 4 is a face view of the disk p', showing the grooves d. Fig. 5 is a detached side view of the upper part of the frame I', containing the devices for cutting the barbing-wire. Fig. 6 is a view of the upper end of the bar L'. Fig. 7 is a face view of the wheel V. Fig. 8 is a detached side elevation of the frame I'. Fig. 9 is a detached view of the wheel E'. Fig. 10 is a view of the pawl and ratchet governing the spooling device. Figs. 11 and 12 are detached views of the guide N'. Fig. 13 is a side elevation of the machine in question. Figs. 14 and 15 are views of the product of the invention. Fig. 16 is a vertical longitudinal section through the line 3 4 of Fig. 1. Fig. 17 is a vertical transverse section through the line 1 2, Fig. 1. Fig. 18 is a cross-section through the line $x\,x$ of Fig. 16.

In the accompanying drawings, A represents the base upon which the machine rests, and B the main shaft, mounted in bearings, and having on one end the wheel D, to which power is applied. The shaft B is connected by a suitable driving-belt with the shaft E, mounted in bearings, and provided on one end with the bevel-gear wheel F, which meshes with the bevel-gear wheel G, secured on the end of shaft H, which is journaled in the upper ends of the standards I, and has its central portions flattened on opposite sides, its ends being circular, the forward end having the horizontal apertures $a$, extending through on each side of the flattened portion of the shaft.

Upon and at right angles to the shaft H is arranged the rod K, its ends extending on each side thereof, and provided with the spools L, which carry the spools of wire $b$ for forming the cable, the free ends of the wire $b$ extending forward and passing through the apertures $a$, one strand being inserted in each aperture. After the wire $b$ leaves the apertures $a$ its strands are carried forward and passed through the hollow shaft M, thence connected with the spooling device N, whereon it is wound in the operation of the machine.

The shaft M is hollow, and mounted in the upper portion of the frame O, and is supplied on its rear end with the cog-wheel P, its other end being somewhat enlarged, forming a disk, $p'$, which is provided on its face with the parallel grooves $d$, which enter the same on opposite sides, and extend almost across it on each side of the aperture $e$.

Upon the shaft B, at a suitable distance from the wheel D, is secured the bevel-gear wheel R, which meshes with the gear-wheel S, attached upon the rear end of the shaft T, mounted in bearings and passing rearward in juxtaposition to the frame O. The shaft T is provided immediately in rear of the bevel-gear wheel S with the gear-wheel V, upon its rear end with the feathered cam W, having the groove $h$, and capable of a sliding movement, and upon its central portions, encompassing the same between the cam and wheel V, with the helical spring X, which affords a spring-tension for the cam W, and retains it in proper relation to the adjacent devices.

The wheel V is supplied on its periphery, on one side, with the teeth $f$, and opposite these with the teeth $g$, the remaining portion of the periphery being a smooth surface.

Upon the forward end of the frame O is pivoted the bell-crank lever Z, the lower arm of which is furnished with an anti-friction wheel, $i$, which enters the groove $h$ of the cam W, the other arm extending upward, and provided in its upper end with the vertical longitudinal slot $k$, and on its face with suitable jaws, which hold the section of die $l$, the face of which is provided with grooves $m$, corresponding with the grooves $d$, opposite to which they come in the operation of the machine, the cable-wire from the aperture $e$ extending through the slot $k$ in order to permit this arrangement.

It is obvious that when the shaft B is rotated motion will be communicated to the shaft E through its driving-belt, and thence, by means of the bevel-gear wheels F G, to the shaft H, carrying the strands of wire, which strands, as before stated, pass forward through the apertures $a$, hollow shaft M, slot $k$, and are attached to the revolving spooling device N. Now it is obvious that the strands of wire $b$, after they leave the apertures $a$ are twisted or cabled by the rotation of the shaft H, and that when the spooling device N is revolved the twisted cable will be automatically drawn from the machine; and it is also obvious that when the shaft B is rotated motion is imparted through the gear-wheels R S to the shaft T and cam W, the revolution of which causes the friction-wheel $i$ to follow the outline of the groove $h$, and thereby gives an oscillating movement to the bell-crank lever Z, bringing the die $l$ with its grooves $m$ up opposite the grooves $d$, and then retracting it therefrom, for the purpose hereinafter mentioned.

Upon the end of the shaft B, opposite to the wheel D, is secured the gear-wheel A', the teeth of which mesh with the similar wheel B', mounted upon one end of the shaft D', having its other end secured in the frame O, adjacent to which the said shaft is provided with the cams $n$ $p$, and at a suitable distance therefrom with the wheel E', having upon its inner face the anti-friction wheel $t$, hereinafter specified.

Upon the outer face of the gear-wheel B' is eccentrically pivoted the rear end of the draw-rod F', the other end of which passes forward and is secured to the arm of the dog H', the upper portion of which encircles the spooling-shaft N, and is supplied with a pawl, $u$, which engages the circular ratchet $w$, also secured upon the spooling-shaft. The purpose of this pawl and ratchet is to revolve the spooling-shaft at every alternate half-revolution of the wheel B', which is accomplished by the pawl engaging the ratchet during one half of a revolution of the wheel B', while during the other half it slips over the teeth of same. Thus the wire is gradually drawn from the machine, permitting it to be properly twisted and barbed.

Upon the outer face of the frame O is secured in a diagonal position the frame I', having the slot K', in the lower portion of which is placed the bar or chisel L', having upon its upper end the angular wedge-shaped cutting-edge $x$, and having its lower end resting upon the upper or curved end of the bar M', which curved end impinges the shaft D', and comes in contact with the cam $p$ when the said shaft is revolved, the lower end of the bar M' being pivoted near the base of the frame O. It is manifest that when the upper end of the bar M' passes over the cam $p$ it will be elevated, and that as the bar L' rests upon it that also will be correspondingly elevated.

Upon the outer face of the frame I' and in close relation to the bar L' is arranged in suitable guides the bar N', the lower end of which is furnished with a friction-wheel, which travels in the cam $n$, the upper end with a fork, in which is loosely secured upon a pivot the guide P', the inner end of which is reduced and conforms in contour with the cutting-edge $x$ before mentioned, immediately over which it is placed. The outer end of the guide P' is wedge-shaped and provided with apertures $y$, which have their exit at each lower corner of the inner or reduced end of the guide P'. In the upper end of the slotted frame I' is rigidly retained the bar S', in the lower end of which is cut the recess $z$, which is adapted to fit over the inner end of the guide P' and cutting-edge $x$.

Adjacent to the frames O and I' is secured the frame T', in the sides of which are mounted the adjustable grooved and flanged feed-rollers V', upon lower ends of the axles of which are secured the cog-wheels W', which mesh with each other, and thereby communicate motion from one feed-roller to the other. The upper end of the axle of the lower feed-roller V' is supplied with a rigid cog-wheel, X', and an oscillating lever, Z', having upon its lower end the segmental gearing $a'$, which engages the rack $b'$, arranged in guides upon the edge of the frame T', provided at its lower end with the spring $d'$, for imparting to it a downward tension. Upon the upper surface of the lever Z' is pivoted the pawl $e'$, which engages the cog-wheel X' in the operation of feeding forward the barbing-wire, and is controlled by a spring, $f'$.

The lower feed-roller V' is provided with two annular grooves, $m'$, and the upper roller with the flanges $n'$, which move in the grooves $m'$, and carry the wire in the said grooves forward when revolved.

In the proper adjustment of the frame T' the grooves in the feed-rollers V' come exactly opposite to the apertures $y$ formed in the dog P'.

The frame T' is provided upon its outer side with a cross-bar, $g'$, having apertures which correspond in position with the grooves in the rollers V'.

Opposite to the frame T' is arranged, upon the outer edge of the base A, the standard $h'$, carrying the two reels $i'$, bearing the spools of wire $k'$, for forming the barbs on the cable $b$.

The strands of the wire $k'$ pass inward from the reels $i'$ through the apertures in the guide $g'$ and between the feed-rollers V'; thence through the apertures $y$ of the guide P' and above the cutting-edge $x$, and then across the face of the disk $p'$, immediately in front of the grooves $d$, one strand being above and the other below the cable $b$.

Motion being imparted to the shaft B, as aforesaid, the wire b, for forming the cable, is operated upon in the manner before specified, and the wire k', for constructing the barbs, as follows: The strands of wire k' being in the position on each side of the wire b in the grooves d, above mentioned, and the machine set in motion, the section of die l attached to the bell-crank lever Z is forced upward against the disk p' by the movement of the cam W, and by means of the grooves m cut in its face presses the ends of the wire k' against the said disk p', that portion of the wire opposite the grooves d being forced into them, while the remaining parts are securely held in the grooves m. In the present instance the outer end of the upper wire and the inner end of the lower wire are held in the grooves m, while the inner end of the upper and the outer end of lower wire are in the grooves d. Thus it is manifest that when shaft M revolves, the ends of the wire retained by the revolving disk p' will be twisted around the cable b, while the ends held in the grooves m remain stationary.

While the upward movement of the die l is being accomplished the blank portion of the wheel V passes the gear-wheel P, and just as the die l firmly impinges the wire k' the teeth f of said wheel V engage the said wheel P and revolve the hollow shaft M. This causes the operation of the ends of the wire k', as above set forth, forming the barb.

During the movement of the hollow shaft M the shaft D' is rotated by the action of the shaft B through the intermediate gearing, and just as the die l firmly impinges the wire k' the cams n p come in contact with the lower end of the bar N' and curved end of the bar M', causing their elevation, and the friction-wheel t with the lower end of the rack b'.

The elevation of the bar N' forces the reduced end of the guide P' upward into the recess z, and that of the bar M' carries the sliding cutter L' up against the said reduced end of the guide. Thus the wire k', being between this reduced end and the upper end of the sliding cutter, is severed. This occurs just as the die l is brought up in close contact with the disk p', the severed portions of the wire being immediately formed into a barb, as before described, and another supply of the wire k' fed to the twisting devices, in the manner hereinafter set forth.

The wheel t causes the rack b', at regular intervals, to ride upward in its guides when the shaft D' is revolved, and this rack b', moving against the segmental gearing a', causes the lever Z' to oscillate toward the hollow shaft M; and as the spring-pawl e' of the said lever is now engaging the cog-wheel X', this wheel also revolves with the lever.

Now as the wheel X' is rigidly secured on the axle of the lower feed-roller V', it is manifest that it will revolve with the said wheel, and that the movement of this feed-roller will be communicated through the gearing W' to the other feed-roller V'. Thus the wire k', by the rotation of these rollers, is fed to the twisting devices.

After the friction-wheel t has passed the end of the rack b' the rack is retracted to its former position by the spring d'. This causes the lever Z' to assume its former position, as above stated, but does not affect the cog-wheel X', the pawl e' slipping over the teeth of same.

When the wheel t again comes in contact with the rack-bar b', the above operation is repeated and another supply of the barbing-wire fed to the twisting devices; but before the wheel t again reaches the rack b' the cams n p have forced the inner end of the guide P' up into the recess z, and the cutting-edge x up against the strands of wire k', cutting them off. After these ends have been cut off, and after the barb has been twisted, as aforesaid, the bell-crank lever Z recedes from the hollow shaft M, and another supply of barbing-wire is fed to the twisting devices, in the manner above described. This operation may be continued as long as desired, or until the required amount of wire has been barbed.

It is obvious that, if preferred, the main wire of the fence may be composed of a single strand, in which a slight change in the arrangement of the coils b would have to be made, but the mechanism for forming the barbs would be the same.

We do not claim, broadly, the combination, of mechanism constructed and arranged to automatically feed forward the fence-wire at stated intervals, and to coil the barb about the fence-wire, and mechanism to feed forward the barb-wires at stated intervals, and mechanism for cutting off the barb-wire; but do claim as our exclusive property the means specified and claimed in our said application for accomplishing the result of the above broad combination.

What we claim as our invention, and desire to secure by Letters Patent, is—

1. The feeding-rollers V', provided, respectively, with the grooves m' and flanges n', substantially as specified.

2. The combination of the feed-rollers V' and their actuating mechanism with the bars L' and S', for cutting off the barbing-wire, the disk p' and die l for twisting the barb, and the spooling device N, for drawing off the cable, all arranged and operating substantially as set forth.

3. The feeding-rollers V', having the lower ends of their axles connected by gear-wheels, and furnished upon the upper end of the axle of the lower roller with the lever Z', and toothed wheel X', in combination with the rack b', spring d', and wheel t, substantially as shown and described.

4. The sliding cutter L', supplied with the cutting-edge x, in combination with the guide P' and anvil S', substantially as shown and described.

5. The sliding cutter L', supplied with the cutting-edge x, the guide P', and anvil S', in combination with the bar M' and cams n p, substantially as set forth.

6. The combination of the grooved and flanged feed-rollers V' with the sliding cutter L', guide P', and anvil S', substantially as specified.

7. The combination of the feed-rollers V', sliding cutter L', guide P', anvil S', grooved revolving disk p', and grooved die l, substantially as set forth.

In testimony that we claim the foregoing improvement in machines for barbing wire, as above described, we have hereunto set our hands this 14th day of May, 1878.

NOBLE G. ROSS.
THOMAS D. ROSS.

Witnesses:
E. L. KING,
A. P. CHAMBERLIN.